United States Patent
Kung et al.

(10) Patent No.: US 6,560,224 B1
(45) Date of Patent: May 6, 2003

(54) AUTOMATIC IP DIRECTORY NUMBER MASKING AND DYNAMIC PACKET ROUTING FOR IP PHONE SURVEILLANCE

(75) Inventors: Fen-Chung Kung, Bridgewater, NJ (US); Jesse Eugene Russell, Piscataway, NJ (US); Anish Sankalia, Iselin, NJ (US); Spencer C. Wang, Parsippany, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/376,462

(22) Filed: Aug. 18, 1999

(51) Int. Cl.[7] .............................................. H04L 12/66
(52) U.S. Cl. ...................................... 370/356; 370/352
(58) Field of Search ................................ 370/356, 352, 370/353, 360, 395.52, 401, 390, 321, 337, 347, 351, 395.1, 395.2, 442, 465, 466, 389; 379/207.02, 211.02, 112.61, 133

(56) References Cited

U.S. PATENT DOCUMENTS

| | | | | |
|---|---|---|---|---|
| 5,920,611 A | * | 7/1999 | Howell | 379/211.02 |
| 5,943,393 A | * | 8/1999 | Howell | 379/211.02 |
| 6,097,798 A | * | 8/2000 | Albers et al. | 379/114.28 |
| 6,115,393 A | | 9/2000 | Engel et al. | 370/469 |
| 6,229,887 B1 | * | 5/2001 | Albers et al. | 379/207.02 |
| 6,233,313 B1 | * | 5/2001 | Farris et al. | 379/112.01 |
| 6,289,025 B1 | | 9/2001 | Pang et al. | 370/352 |

* cited by examiner

Primary Examiner—Ken Vanderpuye
Assistant Examiner—Brian Nguyen

(57) ABSTRACT

Monitored calls are intercepted and rerouted to a changed location number of a called party while appearing to be at the same directory number by intervention of an IP Address Mapping check Point (IP-AMCP) which duplicates the voice to a monitoring location, automatically identifies the types of networks to be traversed to the new location and adapts the duplicated voice message to traverse such network types. Surveillance is enabled to be conducted at more than one monitoring location each of which many are widely separated from the other.

9 Claims, 2 Drawing Sheets

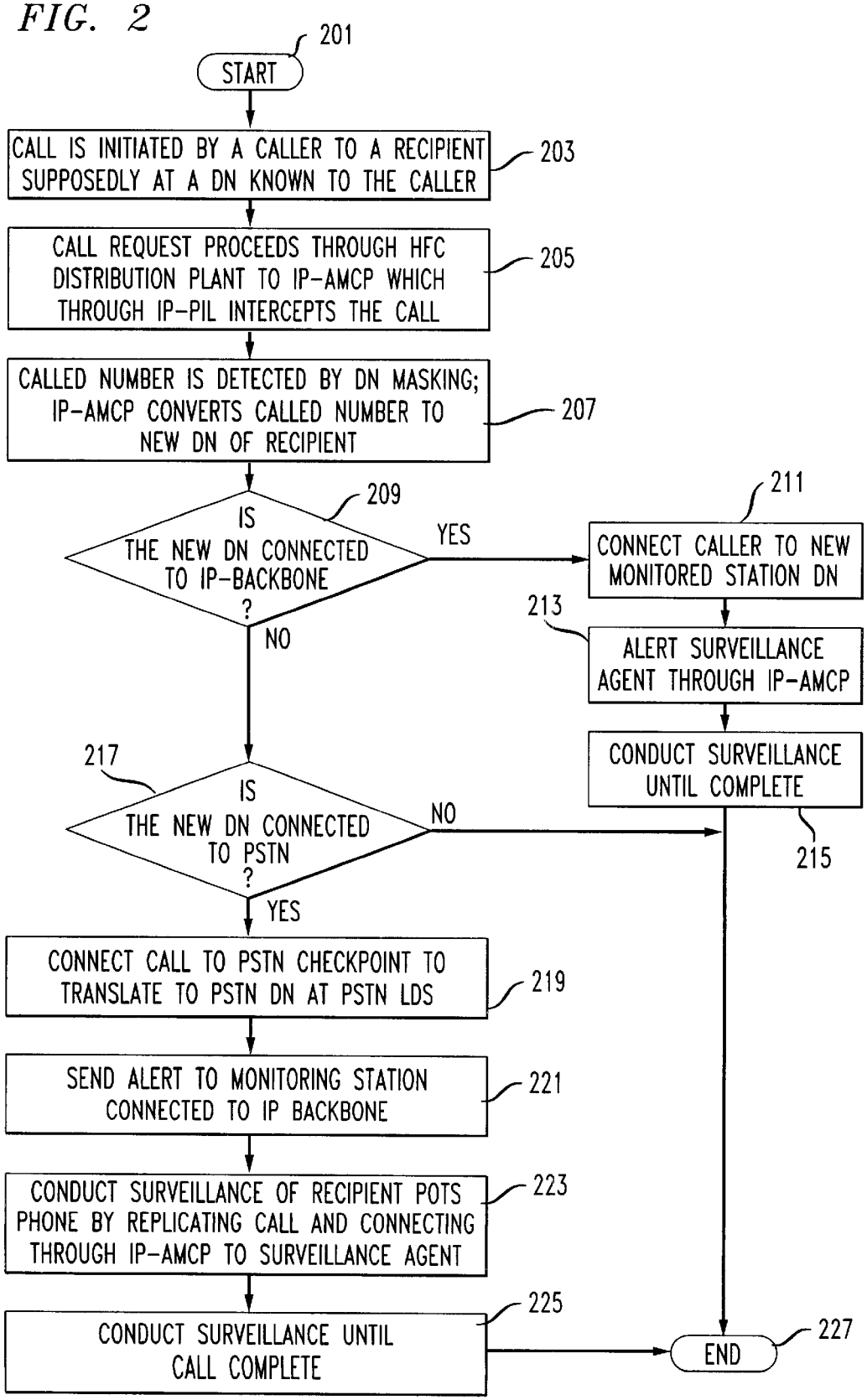

AUTOMATIC IP DIRECTORY NUMBER MASKING AND DYNAMIC PACKET ROUTING FOR IP PHONE SURVEILLANCE

FIELD OF THE INVENTION

This invention relates to surveillance of telephone calls over a public communications link and is particularly concerned with providing assistance for such surveillance to law enforcement agencies. It particularly concerns surveillance of voice over IP (i.e., VOIP) (e.g., cable) networks.

BACKGROUND OF THE INVENTION

Requirements for enabling surveillance of electronic communications have been enacted into public law (e.g., Public Law 103-414 enacted Oct. 25, 1994 CALEA Communications Assistance for Law Enforcement Act) reciting requirements for assuring law enforcement access to electronic communications. Such access is required to be in real time, have full time monitoring capabilities, simultaneous intercepts, and feature service descriptions. The requirements specifically include capacity requirements and function capability. It is incumbent upon communication carriers to provide such capability and capacity.

While initially limited in scope, at present, to certain communications technology it is almost assured that it will be extended to new forms of communication. New technologies require extension of CALEA to the new phone system technologies.

In IP telephony the location of a called party may be dynamic and in motion. It may be desirable to monitor a called party IP telephone even as the location of that phone changes. It may also be appropriate to allow a calling party to remain unaware of the new DN.

SUMMARY OF THE INVENTION

Monitored calls are intercepted and rerouted to a changed location/directory number of a called party while appearing to the caller to be at the same directory number, in accord with the principles of the invention, by intervention of an IP Address Mapping check Point (IP-AMCP) which duplicates the voice to a monitoring location, automatically identifies the types of networks to be traversed to the new location and adapts the duplicated voice message to traverse such network types. Surveillance is enabled to be conducted at more than one monitoring location each of which many are widely separated from the other.

In a particular illustrative embodiment an authorized surveillance agent transmits a valid request to an IP Address Mapping Check Point (IP-AMCP) which in response intercepts voice packets to and from the targeted IP phone. The duplicated voice packets are transmitted to the designated monitoring location. The IP-AMCP determines the type of voice signal to be transmitted to the terminal monitoring station. If the monitoring location is serviced by an IP telephony network the monitored traffic is duplicated by the IP-AMCP in IP format to an IP Directory Number (DN) as programmed in accord with an IP Phone Intercept List (IP-PIL). If the monitoring location is serviced by a PSTN network a PSTN Check Point (PSTN-CP) establishes a trunk connection with the Local Digital Switch (LDS) and receives incoming voice packets at the IP-AMCP which the PSTN-CP converts to Time Division Multiplex (TDM) voice and uses a trunk (i.e., T1) to communicate with the LDS.

A further arrangement allows a caller to call an original number of a changed DN being monitored with surveillance transferred to a new DN of the called party (i.e., the victim) at a new physical location. In this mode the IP-AMCP intercepts the call and queries the IP-PIL for new delivery instructions such as the new destination PSTN or IP phone number.

If the new call transferred to the IP DN needs to be protected, the surveillance agent can remotely turn on an "address masking" feature on the IP-AMCP. Once the feature is activated, the called party's new DN (i.e., calling ID) is replaced with the original DN therefore the call being made appear as the same destination location to the caller.

If the call is initiated from an IP network to a subscriber transferred from IP telephone service back to PSTN network service or vice versa, the IP-PIL query result is used by the IP-AMCP to notify the PSTN-CP to make a new a connection to the Local Digital Switch (LDS)

If the call is initiated from an IP network to an IP phone user at a new IP location, the IP-PIL query result is used by the IP-AMCP to route the call to the new IP location.

If the call is initiated from the PSTN to an old IP phone user at a new PSTN location the IP-AMCP first intercepts the call, queries the IP-PIL and notifies the originating LDS to establish connection with the new destination LDS directly.

BRIEF DESCRIPTION OF THE DRAWING

FIG. 2 is a flow graph explaining the process of the network is operating the system of FIG. 1.

DETAILED DESCRIPTION

Figure 1:
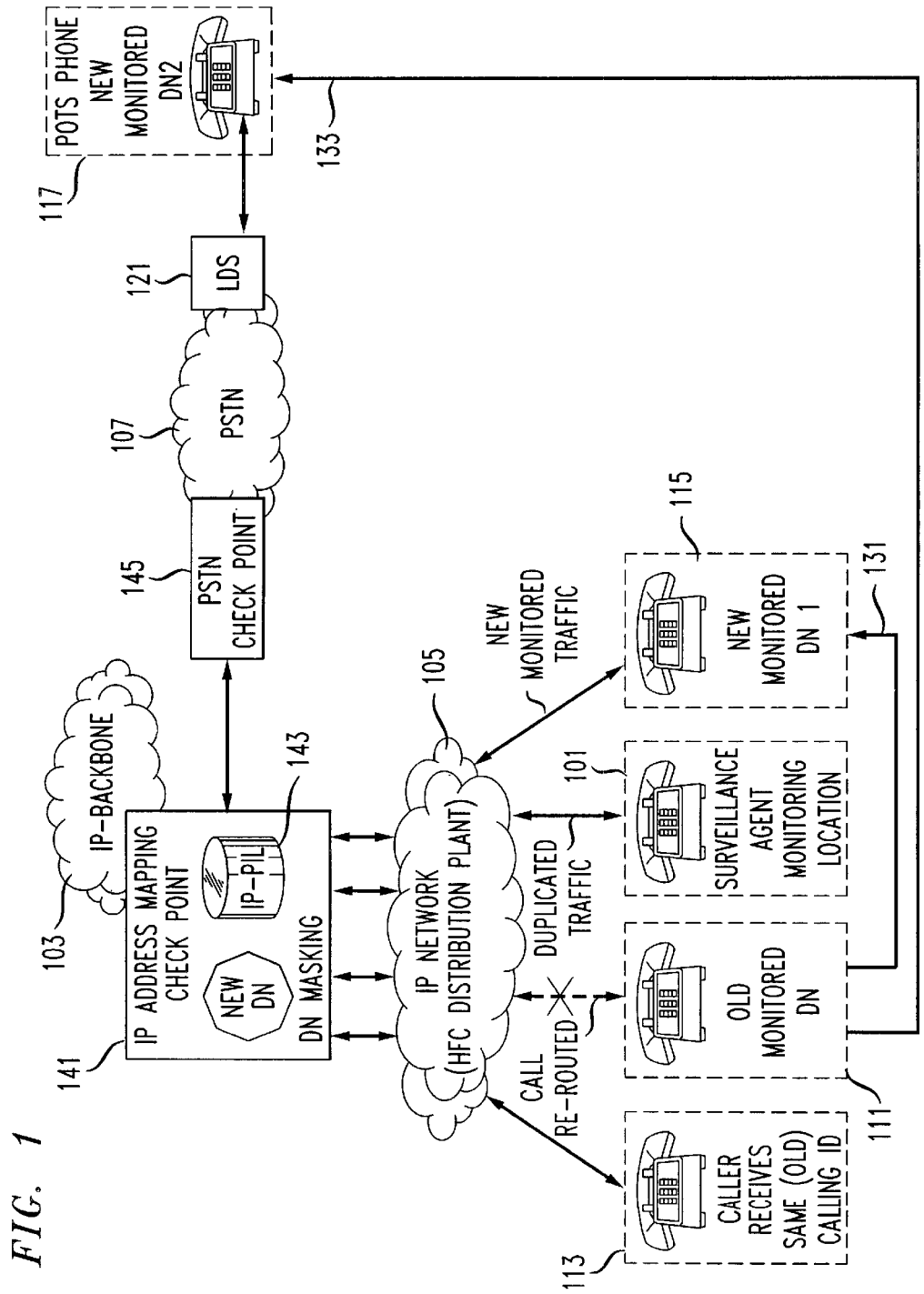
FIG. 1 is a block schematic of a network encompassing the invention principles to dynamically route packets for surveillance purposes and to mask the terminal directory numbers of the routing.

A surveillance system for monitoring calls received by a called party at a receiving station which may change its Directory Number (DN) or its location or its telephone technology, provides for monitoring traffic that the receiving station receives from a calling party whose interactions is to be monitored. This surveillance system, as shown in the FIG. 1, permits a monitored called party to move and dynamically routes calls to be monitored to the new location, Directory Number (DN) and accommodates new telephone technologies that may be encountered in processing the call.

A monitoring station 101 is shown connected to an IP backbone 103, via an Hybrid Fiber Coax (HFC) 105 connected to the IP backbone network 103. HFC is a connection technology having optic fiber connected to the IP backbone network and a coaxial cable connected to the terminal stations. An electro/optical connection joins the optical fiber and coaxial cable. It allows for increased overall broadband services/capacity to be supplied the terminal station.

The receiving caller whose calls are to be monitored is shown as probably connected to its old location at station 111, or at station 115, both of which share the same original DN and both of which are connected to the IP backbone network 103 via the HFC distribution plant 105. Originating station (i.e., caller) 113 is masked from identifying the actual DN and location of the recipient of the calls. Station 111 has been terminated, however this termination is to remain transparent to the caller. Station 115 having the same DN is at a different location. Receiving station 115 connected to the IP backbone network 103 has a new IP DN (i.e.,DN-1)

assigned. Yet another receiving station 117, having a new PSTN DN (DN-2) is shown connected, via a Local Digital Switch (LDS) 121 to a Public Switched Telephone Network. (PSTN) 107. Trajectories 131 and 133 show the migration of the old monitored station 111 to locations now represented by the DN-1 and DN-2.

IP backbone network 103 includes an IP Address Mapping Check Point (IP-AMCP) 141 which duplicates the voice of a monitored station and transmits it to a monitoring location for surveillance and automatically identifying the types of networks to be traversed in such a transmission and adapts the voice message to such a network type to permit communication with monitoring stations connected to different type networks. It also provides masking of the called DN and may deliver the original old DN to the caller's station 113.

The IP-AMCP may be embodied in a server within or connected to the network. It has the capability, through programming, of examining packet contents and authenticating users of the network. With specific WatchDog software the IP-AMCP identifies specific activity from designated telephone stations at a specified DN or IP address and can replicate/duplicate the packets of that phone which replicated/duplicated packets may be forwarded to a monitoring station.

An IP Phone Intercept List (IP-PIL) 143 is associated with IP-AMCP 141 and provides the monitored station 101 with the numbers to which the monitoring intercept is connected and provides conversion information for converting the voice signal to conform with the network type of the monitored station.

In instances of the monitored station 117 being connected to the PSTN system 107, the IP-AMCP 141 converts the format of the monitored signal to a PSTN system format. It is connected to the PSTN system 107, via the PSTN Check Point (PSTN-CP) 145. PSTN-CP 145 establishes a trunk connection with the Local Digital Switch (LDS) 121 and receives incoming voice packets from the IP-AMCP which the PSTN-CP converts to voice trunk (i.e., T1) to communicate with the LDS 121.

Operation of the surveillance network of FIG. 1 may be ascertained by reference to the flow chart of FIG. 2. In a system where the telephone of a recipient of calls is monitored, it may be advisable for that recipient to move and perhaps use a new Directory Number (DN). It is desirable that the caller not be aware of the new DN and that calls to the previous DN appear to the caller that the recipient is still at this same location and DN. It is also desirable that the new DN be readily accessible to the inquiring monitor station for purposes of surveillance.

The process stars at terminal 201 and as per block 203 a caller initiates a call to the intended recipient at the customary DN. The call request is forwarded via an HFC distribution plant to an IP-AMCP which through an IP-PIL listing intercepts the call as per instructions of block 205. The called number is detected by DN masking and the IP-AMCP converts the called number to the new DN of recipient, as per instructions of block 207.

In decision block 209 an inquiry determines if this is a call to a recipient connected to the IP backbone network. If such is the case the call is connected to the recipient DN as per block 211 and the surveillance station is alerted, by means of the IP-AMCP, as per block 213. Surveillance is continued until call is complete a per block 215 and the process ends at terminus 227.

If the decision of block 209 determines that the call is not to an IP DN a subsequent decision of block 217 determines if it is to a PSTN DN. IF not the process is terminated at end 227. If yes the instructions of block 219 connect the call to an PSNT checkpoint which translates the DN to PSTN form for delivery to the PSTN LDS.

The surveillance is alerted as per block 221 instructions and the station is connected via the IP-AMCP to monitor the call. The IP-AMCP replicates the traffic as per block 223 for delivery to the surveillance agent. Surveillance is terminated as per block 225 at the end of the call and the process terminates at terminus 227.

The following applications are being filed concurrently with the present application and are incorporated herein by reference. All applications have the same inventors (e.g., Kung, Russell, Sankalia and Wang):

U.S. patent application Ser. No. 09/375,754, filed Aug. 18, 1999, entitled Monitoring Selected IP Voice Calls Through Activity of a WatchDog Program at an IP-Addressing Mapping Check Point;

U.S. patent application Ser. No. 09/375,750, filed Aug. 18, 1999, entitled Monitoring IP Voice Calls Under Command of a PSTN Phone;

U.S. patent application Ser. No. 09/376,782, filed Aug. 18, 1999, entitled Flexible Packet Technique for Monitoring Calls Spanning Different Backbone Networks;

U.S. patent application Ser. No. 09/376,783, filed Aug. 18, 1999, entitled Multiple Rotiiiig and Automatic Network Detection of a Monitored Call from an Intercepted Targeted IP Phone to Multiple Monitoring locations;

U.S. patent application Ser. No. 09/376,459, filed Aug. 18, 1999, entitled Secure Detection, of an Intercepted Targeted IP Phone from Multiple Monitoring Locations;

U.S. patent application Ser. No. 09/376,454, filed Aug. 18, 1999, entitled IP Voice Call Surveillance Through use of Non-dedicated IP Phone with Signal Alert Provided to Indicate Content of lncoming Call Prior to an Answer as Being a Monitored Call.

While exemplary systems and methods embodying the present inventions are shown by way of example, it will be understood, of course, that the invention is not limited to these embodiments. Modifications may be made by those skilled in the art which differ from the specific details disclosed here, but which are still within the scope of the invention. Further elements of one invention may be readily included as elements of one of the other inventions. Those skilled in the art may combine or distribute the elements in many different ways without departing from the spirit and scope of the invention.

What we claim is:

1. A method of dynamically routing packets intercepted for surveillance purposes of VoIP subscribers moved to a new location and masking directory numbers (DN) of a monitored phone, comprising the steps of:

sending a request for surveillance to enable monitoring of a target IP phone having a particular newly assigned DN but presently known to a caller to telephone as having a previously assigned DN;

intercepting and duplicating voice packets from the target monitored IP phone with an IP address mapping check point (IP-AMCP) in response to a command from a surveillance action;

establishing an IP phone intercept list (IP-PIL) data base which is utilized by the IP-AMCP AMCP to correlate the previously assigned DN to the newly assigned DN;

querying the IP-PIL data base by the IP-AMCP to determined the newly assigned DN to which a call is to be directed;

transmitting the call to the newly assigned DN in response to the IP-AMCP;

determining network types to be traversed from the caller to the newly assigned DN;

directing the intercepted and duplicated voice packets to the newly assigned DN properly formatted in the form needed for the types of networks it traverses, in response to the commands of the IP-AMCP; and directing the intercepted and duplicated voice packets to the surveillance station properly formatted in the form needed from the types of networks it traverses, in response to commands of the IP-AMCP.

2. The method of claim 1 further including the step of:

masking the newly assigned DN of the surveillanced phone from the caller.

3. The method of claim 2 further including the step of:

initiating the masking in response to a command issued by a remote surveillance agent.

4. The method of claim 3 further including a step of:

protecting an identity of the newly called DN in response to activation of masking by the surveillance agent.

5. The method of claim 1, further including a step of:

converting an IP format to a TDM format when the monitoring station is connected to a PSTN system.

6. A surveillance system for accommodating and masking changes in a directory number DN, comprising:

a subscriber station to be monitored which now has a different DN succeeding a previous DN;

a caller station calling the subscriber station and directing a call to the previous DN which preceded the present different DN;

a monitoring station connected for monitoring voice traffic of the subscriber station to be monitored;

an IP phone intercept list (IP-PIL) database for correlating the different DN with the previous DN; and an IP-address mapping check point (IP AMCP) connected for intercepting voice packets from the subscriber station being monitored, and connected to query the IP-PIL in order to direct the call to the different DN including formatting the voice packets to accommodate a type of network to be traversed to the different DN and to the monitoring station.

7. The surveillance system of claim 6, further comprising:

means for enabling a masking of the different DN from the caller station.

8. The surveillance system of claim 6, further comprising:

a PSTN check point interconnecting the IP-AMCP to a voice trunk for monitoring the subscriber station connected to a PSTN system.

9. The surveillance system of claim 8, further comprising:

a local directory switch (LDS) interconnecting the voice trunk to the subscriber station.

* * * * *